(12) United States Patent
Chang et al.

(10) Patent No.: US 7,831,751 B2
(45) Date of Patent: Nov. 9, 2010

(54) SYSTEM AND METHOD FOR PROGRAMMING A DISPLAY CONTROLLER CHIP

(75) Inventors: Yi-Shu Chang, Hsin-Chu Hsien (TW); Wen-Che Wu, Hsin-Chu Hsien (TW); Wen-Jui Lin, Nan-Tou Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 386 days.

(21) Appl. No.: 11/306,190

(22) Filed: Dec. 19, 2005

(65) Prior Publication Data

US 2007/0165036 A1 Jul. 19, 2007

(51) Int. Cl.
*G06F 13/10* (2006.01)

(52) U.S. Cl. .......................... 710/62; 711/103
(58) Field of Classification Search .................. None
See application file for complete search history.

(56) References Cited

U.S. PATENT DOCUMENTS

| 6,023,570 | A | * | 2/2000 | Tang et al. ................ 716/17 |
| 6,295,053 | B1 | | 9/2001 | Tsai et al. |
| 6,523,083 | B1 | * | 2/2003 | Lin et al. ................ 711/103 |
| 6,577,301 | B1 | * | 6/2003 | Tsai et al. ................ 345/204 |
| 6,636,992 | B1 | | 10/2003 | Yuan et al. |
| 6,661,411 | B1 | | 12/2003 | Tsai et al. |
| 6,697,058 | B2 | * | 2/2004 | Tsai ........................ 345/204 |
| 2003/0023962 | A1 | * | 1/2003 | Erickson et al. ............ 717/171 |
| 2004/0049727 | A1 | | 3/2004 | Wang |
| 2004/0133711 | A1 | | 7/2004 | Chen |
| 2005/0120384 | A1 | * | 6/2005 | Stone et al. ................ 725/132 |
| 2006/0092323 | A1 | * | 5/2006 | Feeler et al. ................ 348/553 |

FOREIGN PATENT DOCUMENTS

| JP | 04052832 A | 2/1992 |
| JP | 2001229028 A | 8/2001 |
| JP | 2005085039 A | 3/2005 |

OTHER PUBLICATIONS

Taiwan language Office Action dated Jun. 8, 2010.

* cited by examiner

*Primary Examiner*—Ilwoo Park
(74) *Attorney, Agent, or Firm*—Thomas, Kayden, Horstemeyer & Risley, LLP

(57) ABSTRACT

A system for programming at least a controller chip is disclosed. The system includes a programming apparatus and at least a programmable device mounted on the programming apparatus. The programming apparatus has at least a first connection interface and a micro-controller. The programmable device has the monitor controller chip mounted thereon and a second connection interface coupled between the first connection interface and the controller chip. The micro-controller controls the programming of the controller chip.

13 Claims, 4 Drawing Sheets

SYSTEM AND METHOD FOR PROGRAMMING A DISPLAY CONTROLLER CHIP

BACKGROUND OF THE INVENTION

1. Field of the Invention

The present invention relates to code programming, and more particularly, to a method for programming a controller chip.

2. Description of the Prior Art

LCD monitors have gradually taken over from traditional displays, as they are lightweight and inexpensive devices.

When programming a display controller chip, two conventional methods are traditionally used. The first conventional method involves connecting a controller chip, which has been installed on an LCD monitor, to an external programming apparatus by the use of a cable connected to a cable interface (e.g. VGA interface or DVI interface) of the LCD monitor. This method is relatively slow, however, and inconvenient, as the cable has to be connected correctly to the interface and only a single LCD display controller chip can be programmed at one time.

To solve this problem, a second conventional method inserts a plurality of display controller chips into sockets on the programming apparatus. In other words, the second conventional method programs the display controller chip before the display controller chip is installed in the LCD monitor. Since the controller chips are inserted into the sockets for code programming, the connecting pins of the controller chips might be damaged when being inserted into or removed from the sockets, thereby degrading the productivity of the code-programmed controller chips.

SUMMARY OF THE INVENTION

It is therefore one of the objectives of the claimed invention to provide a method for code programming by programming a display controller chip already mounted on a sub-printed circuit board (PCB) connected to a main PCB of a programming apparatus, and related apparatus thereof, to solve the above problems.

It is another objective of the claimed invention to provide display controller chips which are mounted on sub-PCBs therefore preventing damage to the pins by removal and wear.

The claimed invention provides a display controller chip utilized for controlling a device. The display controller chip comprises: a non-volatile memory for storing program codes; an interface for communicating data and instructions; a micro-controller unit (MCU) for executing the program codes stored in the non-volatile memory; a control circuit, for selectively enabling and disabling the MCU, wherein the control circuit receives an instruction from the interface to disable the MCU when the non-volatile memory is being programmed; a write buffer; and a write control circuit for storing program codes received via the interface to the write buffer and writing program codes buffered in the write buffer to the non-volatile memory for programming the non-volatile memory.

The claimed invention further provides a method for programming a display controller chip utilized for controlling a specific monitor. The method comprises providing the display controller chip with a non-volatile memory for storing program codes; an interface for communicating data and instructions; a micro-controller unit (MCU) for executing the program codes stored in the non-volatile memory to control operation of the display device; and a write buffer. The method further comprises receiving an instruction from the interface to disable the MCU; and storing program codes received via the interface to the write buffer, and writing program codes buffered in the write buffer to the non-volatile memory for programming the non-volatile memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
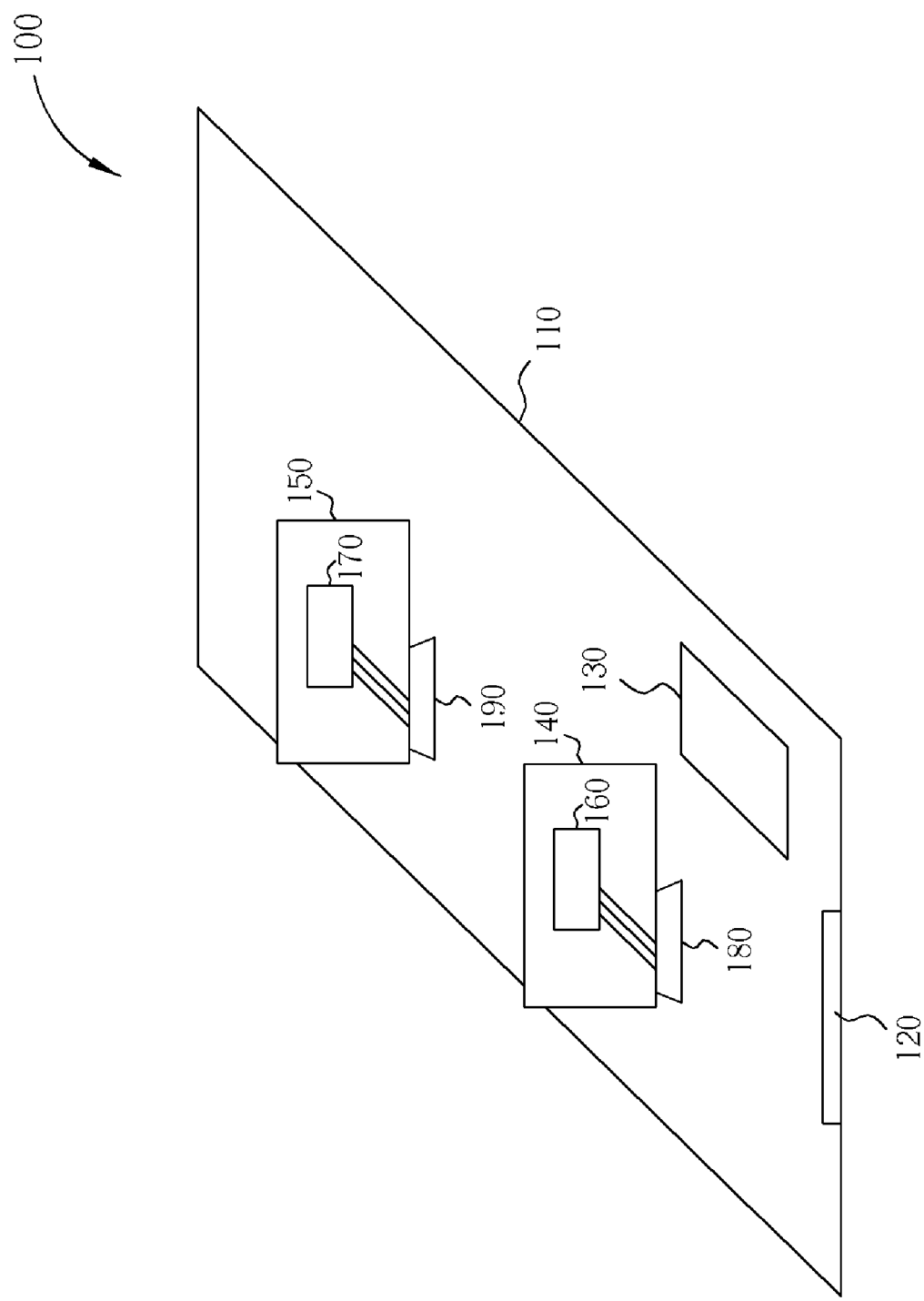
FIG. 1 is a diagram of a programming system according to an embodiment of the present invention.

Please refer to FIG. 1. FIG. 1 is a diagram of a programming system 100 according to an embodiment of the present invention. The programming system 100 is used to perform code programming for a plurality of controller chips 160, 170. As shown in FIG. 1, the programming system 100 comprises a main printed circuit board (PCB) 110, having a micro-controller unit (MCU) 130, and a plurality of sub-PCBs 140 and 150 mounted on the main PCB 110. In this embodiment the two sub-PCBs are PCBs that have at least a controller mounted on them and are installed into the display device. Sub-PCBs 140 and 150 comprise controller chips 160 and 170 respectively, which are integrated circuits (ICs) in this embodiment. The sub-PCBs 140 and 150 have interfaces 180 and 190 respectively that are connected to the controller chips 160 and 170. Please note that in this diagram, only one display controller chip is illustrated as being mounted on each sub-PCB; however, this number is not a limitation of the present invention, and more than one display controller chip can be mounted on a single sub-PCB. The MCU 130 is utilized for controlling validation and program operations, and storing program codes into the controller chips 160, 170. The main PCB 110 further comprises an interface 120 for receiving program code data and data request instructions. In addition, the main PCB 110 is further capable of programming at least one external display controller chip (not shown) through the interface 120. In an embodiment, the interface 120 can be implemented by a VGA or a DVI interface. These implementations are not limitations of the present invention.

In this embodiment, the combination of the MCU 130, main PCB 110 and interfaces 120, 180, 190 serve as a programming apparatus. The sub-PCBs 140, 150 having controller chips 160 and 170 mounted thereon act as programmable devices that are to be installed into display devices after the code programming is completed. In other words, once the controller chips 160, 170 have been programmed, the entire sub-PCBs 140, 150 can be removed from the main PCB 110 and placed in the display device, so the connecting pins of the controller chips 160, 170 are prevented from being damaged. Similarly, when the controller chips 160, 170 require re-programming, the sub-PCBs 140, 150 can be removed and placed back on the main PCB 110 for code programming, so there is no need for the chip to be removed individually and no damage will be applied to connecting pins of the chip. In short, the use of the sub-PCBs 140, 150 prevents pin damage due to constant wear and tear.

Figure 2:
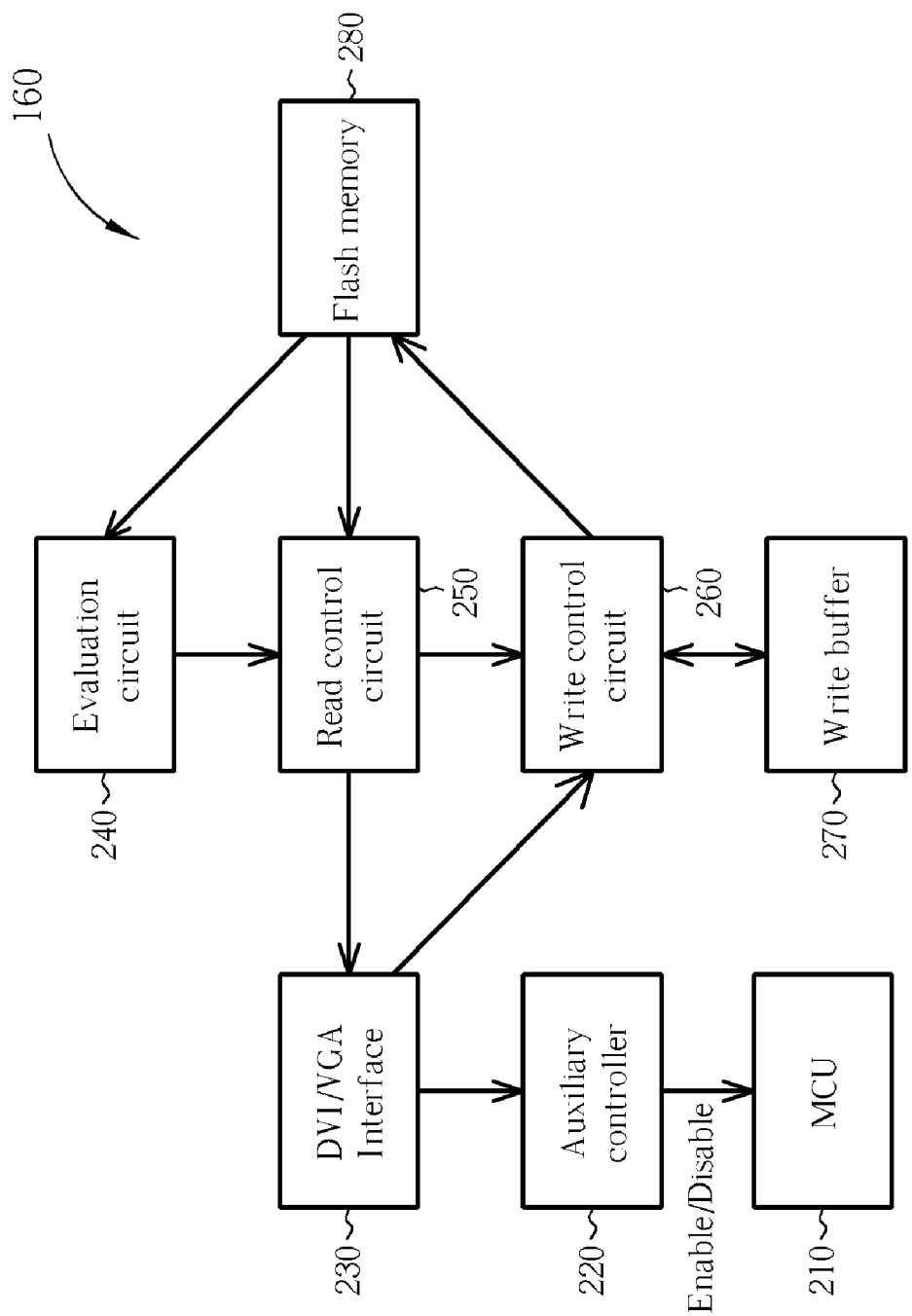
FIG. 2 is a block diagram of a display controller chip shown in FIG. 1.

Please refer to FIG. 2. FIG. 2 is a block diagram of the display controller chip 160 shown in FIG. 1 according to an embodiment of the present invention. Only the display controller chip 160 is detailed in FIG. 2 for brevity. The display controller chip 160 comprises an MCU 210 for executing normal operation of the display controller chip 160. When data request instructions are received through an interface 230 (in this embodiment the interface is realized by a DVI/VGA interface), an auxiliary controller 220 disables the MCU 210 during the code programming process. For example, the auxiliary controller 220 disables the MCU 210, and program codes, such as firmware data, are received from the DVI/VGA interface 230 and then sent to the write control circuit 260. The present invention improves over the related art, however, by first sending requested data to a write buffer 270, and then sending it to the FLASH memory 280. This utilization of the write buffer 270 enables both the MCU 210 and the FLASH memory 280 to operate at maximum speed, as the write buffer 270 has a faster operating speed than the FLASH memory 280, so data (program codes) can be written to the display controller chip 160 faster than if no write buffer were present. The evaluation circuit 240 is used to evaluate the data stored into the FLASH memory 280 to check validity of the programmed data. The read control circuit 250 controls the data reading of the FLASH memory 280. When the display controller chip 160 is a display controller, the display controller chip 160 further comprises an image processing unit (not shown in FIG. 2), such as a scaler, or a de-interlacing module.

Figure 3:
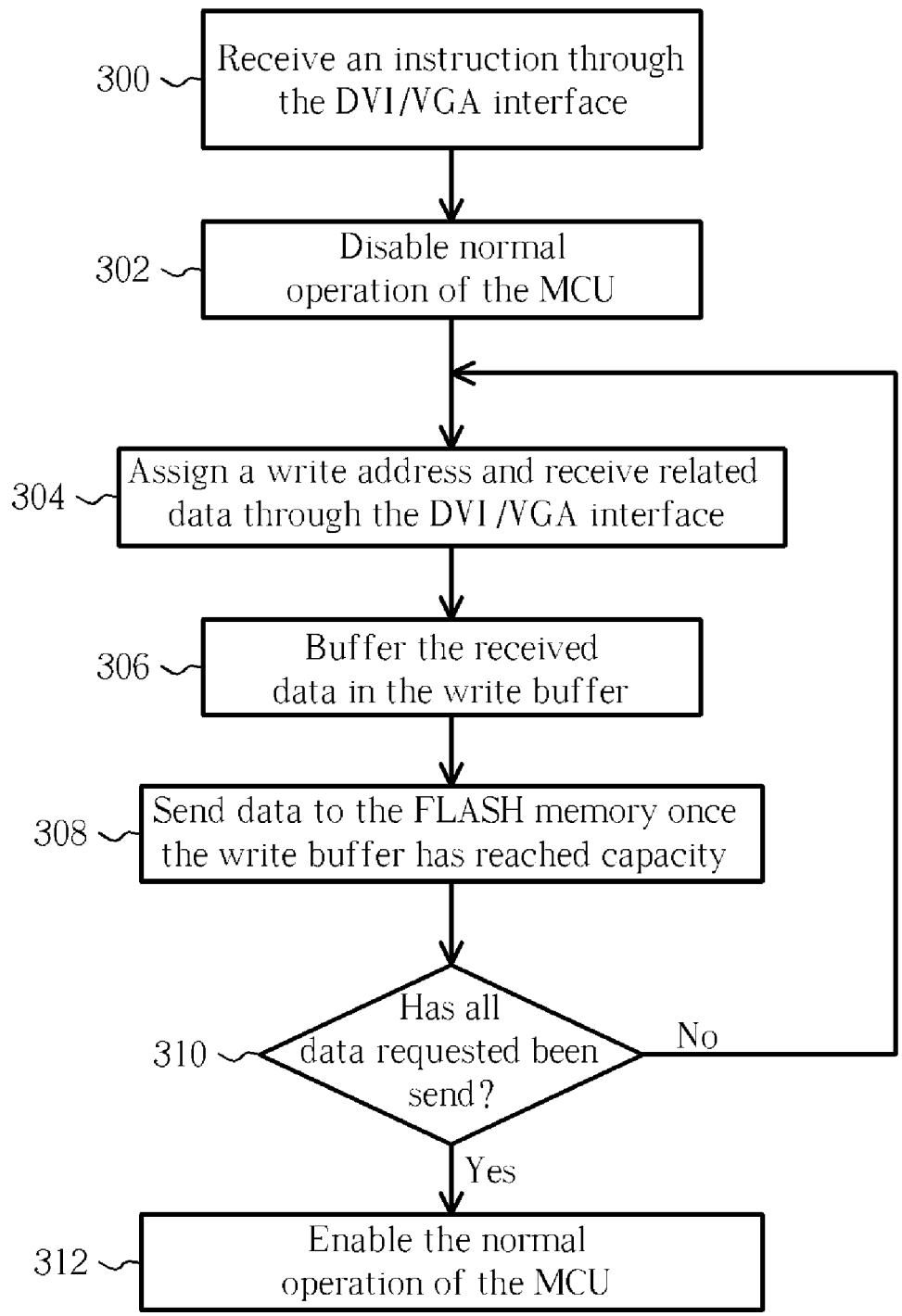
FIG. 3 is a flowchart of a code programming process of the display controller chip shown in FIG. 2 according to a first embodiment of the present invention.

Please refer to FIG. 3. FIG. 3 is a flowchart of a code programming process of the display controller chip 160 shown in FIG. 2. The steps are as follows:

Step 300: Receive an instruction through the DVI/VGA interface 230.

Step 302: Disable the normal operation of the internal MCU 210.

Step 304: Assign a write address, and receive related data through the DVI/VGA interface 230. In one embodiment, the write control circuit 260 assigns a write address for programming the FLASH memory 280 and receives data (program codes) from the DVI/VGA interface 230. In another embodiment, the program codes to be programmed into the FLASH memory 280 are provided by the external programming apparatus and transmitted to the display controller chip 160 through the interfaces 180 and 230.

Step 306: Buffer the received data in the write buffer 270.

Step 308: Send data to the FLASH memory 280 once the write buffer 270 has reached capacity.

Step 310: Has all data requested been sent to the FLASH memory 280? If yes, go to step 312; otherwise, go to step 304.

Step 312: Enable the normal operation of the internal MCU 210.

In a preferred embodiment, the utilization of the write buffer 270 enables the write process to continue without waiting for a write to go to the FLASH memory 280. In other words, the implementation of the write buffer 270 offers a sequential data writing scheme to improve the code programming performance. Moreover, it should be noted that the aforementioned data buffering scheme is only meant to be an example, and other data buffering schemes could be implemented in other embodiments of the present invention.

Figure 4:
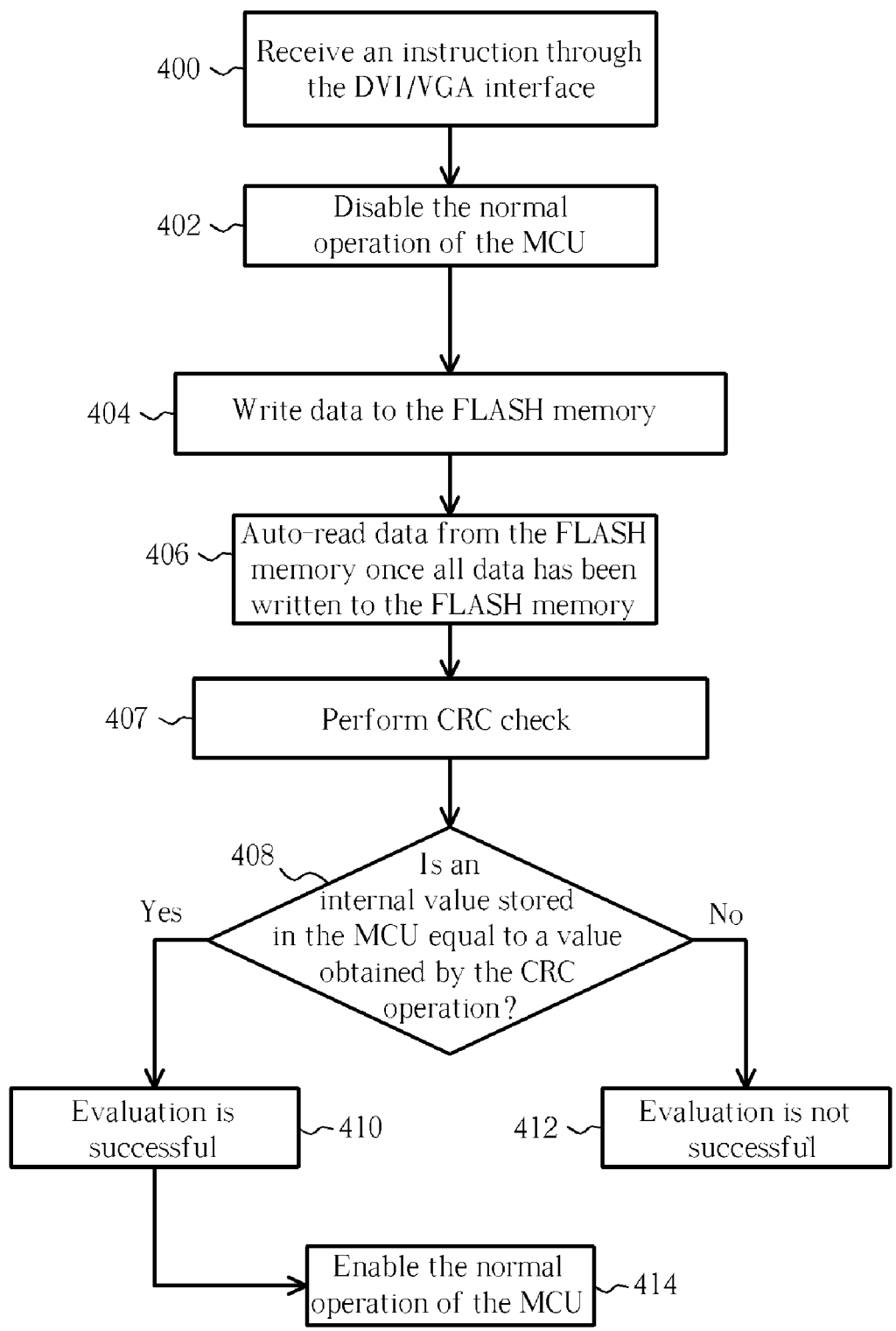
FIG. 4 is a flowchart of a code programming process of the display controller chip shown in FIG. 2 according to a second embodiment of the present invention.

The invention further provides an evaluation process, integrated in the code programming process, for determining whether data written to the display controller chip is correct. Please refer to FIG. 4. FIG. 4 is a flowchart of a code programming process of the controller 160 shown in FIG. 2 according to the present invention. The steps are as follows:

Step 400: Receive an instruction through the DVI/VGA interface 230.

Step 402: Disable the normal operation of the internal MCU 210.

Step 404: Write data to the FLASH memory 280.

Step 406: Auto-read data back from the FLASH memory 280 once all data has been written to the FLASH memory 280.

Step 407: Perform a CRC check on each byte of data.

Step 408: Is an internal value stored in the MCU 130 equal to a value obtained by the CRC operation? If yes, go to step 410; otherwise, go to step 412.

Step 410: Evaluation is successful. Go to step 414.

Step 412: Evaluation is not successful.

Step 414: Enable the normal operation of the internal MCU 210.

For code programming, the MCU 130 on the main PCB 110 will disable the operation of the MCU 210 in the display controller chip 160 through the auxiliary controller 220 via issuing an instruction to the DVI/VGA interface 230 (steps 400 and 402). Then, the write control circuit 260 inside the display controller chip 160 writes received data (program codes) to the FLASH memory 280 (step 404). In this embodiment, the method assigns a predetermined amount of data to be evaluated, by assigning a start and end address in the FLASH memory 280. For example, the start address and the end address in the FLASH memory 280 define a data length corresponding to the whole program codes needed to be programmed into the FLASH memory 280. Therefore, once it is determined all data (all program codes) have been written to the FLASH memory 280, the programmed data will be automatically read back to the evaluation circuit 240, where a CRC check will be performed on each byte of programmed data (step 407). Through evaluating the programmed data, the evaluation circuit 240 computes a CRC value. Then, the evaluation circuit 240 compares the computed CRC value with a value stored in the MCU 130 mounted on the main PCB 110; if the computed CRC value is determined to be correct, the MCU 130 will re-activate the MCU 210 of the display controller chip 160 by instructing the auxiliary controller 220 (steps 408, 410 and 414). If the computed CRC value is not correct, however, the display controller chip 160 will be programmed again or deemed to be a bad chip.

In a preferred embodiment, step 404 adopts the aforementioned data writing scheme shown in FIG. 3 to optimize code programming efficiency. That is, the write buffer 270 is utilized to buffer the received data (program codes) when the write control circuit 260 writes the received data (program codes) into the FLASH memory 280. However, the evaluation process of the present invention is not limited to be combined with the data writing scheme shown in FIG. 3. For other embodiments not using the data writing scheme shown in FIG. 3, the same objective of obtaining faster data evaluation speed is still achieved by performing the CRC check only after all data to be evaluated has been written to the non-volatile memory.

The mounting of the controller chips on sub-PCBs prevents damage occurring to the connecting pins through removal and wear. The write buffer in the controller chips allows write information to be buffered before being passed to the non-volatile memory (e.g. FLASH memory), therefore enabling both the MCU and the non-volatile memory to operate at maximum speed for code programming. The evaluation process allows faster evaluation of data by performing the CRC check only after all data to be evaluated has been written to the non-volatile memory.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display controller chip mounted on a sub-printed circuit board (sub-PCB) utilized for controlling a display device, the display controller chip comprising:
    a non-volatile memory for storing program codes;
    video interface for communicating data and instructions;
    a micro-controller unit (MCU) for executing the program codes stored in the non-volatile memory to control operation of the display device;
    a control circuit, coupled to the interface, for selectively enabling and disabling the MCU, wherein the control circuit receives an instruction from the interface to disable the MCU when the non-volatile memory is being programmed;
    a write buffer for buffering program codes to be written to the non-volatile memory;
    a write control circuit coupled to the interface, the write buffer and the non-volatile memory, the write control circuit being configured to buffer program codes received via the interface in the write buffer, the write control circuit being further configured to write the program codes buffered in the write buffer to the non-volatile memory for programming the non-volatile memory; and
    an evaluation circuit configured to check the validity of program codes written to the non-volatile memory based on a predetermined amount of data to be evaluated and a value stored in a controller mounted on a main PCB having a plurality of sub-PCBs, wherein the predetermined amount of data is defined in the non-volatile memory.

2. The display controller chip of claim 1, wherein the display device is an LCD monitor.

3. The display controller chip of claim 1, wherein the interface is a DVI interface.

4. The display controller chip of claim 1, wherein the interface is a VGA interface.

5. The display controller chip of claim 1, wherein the non-volatile memory is a FLASH memory.

6. The display controller chip of claim 1, further comprising an image processing unit for processing a received data from the interface and thereby outputting a processed data.

7. A method for programming a display controller chip mounted on a sub-printed circuit board (sub-PCB) utilized for controlling a display device, the method comprising:
    providing the display controller chip with:
        a non-volatile memory for storing program codes;
        a video interface for communicating data and instructions;
        a micro-controller unit (MCU) for executing the program codes stored in the non-volatile memory to control operation of the display device; and
        a write buffer;
    receiving an instruction from the interface to disable the MCU;
    storing program codes received via the interface in the write buffer, and
    writing program codes buffered in the write buffer to the non-volatile memory for programming the non-volatile memory; and
    checking the validity of program codes written to the non-volatile memory based on a predetermined amount of data to be evaluated and a value stored in a controller mounted on a main PCB having a plurality of sub-PCBs, wherein the predetermined amount of data is defined in the non-volatile memory.

8. The method of claim 7, wherein the display device is an LCD display device.

9. The method of claim 7, wherein the interface is a DVI interface.

10. The method of claim 7, wherein the interface is a VGA interface.

11. The method of claim 7, wherein the non-volatile memory is a FLASH memory.

12. The method of claim 7 further comprising:
    when the non-volatile memory is completely programmed by storing the program codes received via the interface, checking the validity of all of the program codes in the non-volatile memory.

13. The method of claim 12, wherein the interface is a DVI interface.

* * * * *